(12) United States Patent
Chae et al.

(10) Patent No.: US 7,535,121 B2
(45) Date of Patent: May 19, 2009

(54) HIGH VOLTAGE POWER SUPPLY APPARATUS AND METHOD OF CORRECTING CURRENT OUTPUT FROM THE APPARATUS

(75) Inventors: Young-min Chae, Gyeonggi-do (KR); Jong-hwa Cho, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 507 days.

(21) Appl. No.: 10/841,465

(22) Filed: May 10, 2004

(65) Prior Publication Data

US 2004/0228049 A1 Nov. 18, 2004

(30) Foreign Application Priority Data

May 14, 2003 (KR) .................. 10-2003-0030504
Sep. 5, 2003 (KR) .................. 10-2003-0062176

(51) Int. Cl.
*H02J 3/38* (2006.01)
*H03K 17/14* (2006.01)
*H02M 3/335* (2006.01)

(52) U.S. Cl. .................. 307/52; 327/378; 363/21.09; 363/21.15; 363/21.17; 363/21.18

(58) Field of Classification Search .......... 327/378; 361/81; 363/21.18, 21.15, 21.17, 21.09; 307/52

See application file for complete search history.

(56) References Cited

U.S. PATENT DOCUMENTS

| | | | |
|---|---|---|---|
| 4,471,399 A | * | 9/1984 | Udren .......... 361/64 |
| 4,929,970 A | | 5/1990 | Inui |
| 5,483,183 A | * | 1/1996 | Li et al. .......... 327/54 |
| 5,493,154 A | * | 2/1996 | Smith et al. .......... 307/43 |
| 5,822,651 A | * | 10/1998 | Yim et al. .......... 399/66 |

(Continued)

FOREIGN PATENT DOCUMENTS

JP 1-164973 5/1990

(Continued)

OTHER PUBLICATIONS

Office Action issued by the Korean Intellectual Property Office on Jun. 3, 2005 in Korean Patent Application No. 10-2003-0062176.

*Primary Examiner*—Albert W Paladini
*Assistant Examiner*—Hal I Kaplan
(74) *Attorney, Agent, or Firm*—Staas & Halsey LLP

(57) ABSTRACT

A high voltage power supply apparatus and a method of correcting current output from the high voltage power supply apparatus. The high voltage power supply apparatus includes a switching unit; a transformer; a pulse width modulation signal processing unit, which receives a pulse width modulation signal changed for environmental conditions, converts the received pulse width modulation signal into a direct current (DC) voltage, and outputs the converted signal as a reference signal; a drive control signal generating unit, which compares an output current signal output from the transformer with the reference signal, and outputs a drive control signal to drive the switching unit; and an output current detecting unit, which detects the output current signal. Accordingly, the magnitude of current output from the high voltage power supply apparatus can vary according to environmental conditions and the current can be uniformly output without an output error.

20 Claims, 6 Drawing Sheets

U.S. PATENT DOCUMENTS

| | | | |
|---|---|---|---|
| 6,473,317 B1 * | 10/2002 | Simopoulos | 363/21.06 |
| 6,667,843 B2 * | 12/2003 | Norman et al. | 360/67 |
| 6,770,985 B2 * | 8/2004 | Yabe et al. | 307/117 |

FOREIGN PATENT DOCUMENTS

| | | |
|---|---|---|
| JP | 4217280 | 8/1992 |
| JP | 2002036485 | 2/2002 |
| KR | P1993-8676 | 5/1993 |
| KR | 1998-63927 | 11/1998 |
| KR | 2000-45095 | 7/2000 |
| KR | 10-327538 | 2/2002 |

* cited by examiner

HIGH VOLTAGE POWER SUPPLY APPARATUS AND METHOD OF CORRECTING CURRENT OUTPUT FROM THE APPARATUS

CROSS-REFERENCE TO RELATED APPLICATIONS

This application claims the priority of Korean Patent Application Nos. 2003-30504 and 2003-62176, filed on May 14, 2003 and Sep. 5, 2003, respectively, in the Korean Intellectual Property Office, the disclosures of which are incorporated herein in its entirety by reference.

BACKGROUND OF THE INVENTION

1. Field of the Invention

The present invention relates to a high voltage power supply apparatus used in a laser printer, a multifunction printer, and so on, and more particularly, to a high voltage power supply apparatus, which can vary the magnitude of current output therefrom according to environmental conditions and uniformly output the current irrespective of the characteristics of the electronic devices used therein, and a method of correcting the current output from the apparatus.

2. Description of the Related Art

Multifunction printers or laser printers scan a laser beam on an electro statically charged, photoconductive drum to produce latent characters or images of a page on the drum and transfer toner to printing paper to develop the latent characters or images. The multifunction printers or laser printers fix the developed characters or images to the printing paper and output printed matter with the characters or images.

Multifunction printers or laser printers use a high voltage in order to perform the above operations. To obtain the high voltage, the multifunction printers or laser printers employ a high voltage power supply apparatus. Such a high voltage power supply apparatus includes a signal input unit, a switching control unit, a switching unit, and a fly back transformer to output the high voltage current. The signal input unit receives from a central processing unit (CPU) an enable signal indicating whether to output a high voltage. The switching control unit outputs, in response to the enable signal, a control signal to drive the switching unit. The switching unit generates a voltage on a primary side of the fly back transformer in response to the control signal output from the switching control unit. The fly back transformer boosts the voltage generated in a coil on the primary side thereof, rectifies the high voltage, and outputs the rectified voltage via an output terminal of a coil on a secondary side thereof.

According to the conventional art, the CPU simply determines whether to turn on or off current output from the high voltage power supply apparatus without regard to environmental conditions and outputs the enable signal on the basis of the determination, and the high voltage power supply apparatus turns on or off the current in response to the enable signal. Because the conventional high voltage power supply apparatus cannot control the output current according to environmental conditions, e.g., temperature and humidity, it is difficult to create a uniform electric potential on the surface of the photoconductive drum and ensure a high quality image. The conventional high voltage power supply apparatus has another disadvantage in that the output current cannot be uniformly output from the fly back transformer due to the characteristics of an electronic device used in the apparatus or other reasons.

If a distance between circuits is not sufficient due to miniaturization of a high voltage power supply apparatus and space reduction and functional enhancement of a printed circuit board (PCB), voltage induction may occur between the circuits and the circuits may malfunction due to noise. In particular, since high voltages used by laser printers are output from multiple output terminals, an abnormal high voltage is output from an output terminal due to an influence of a high voltage generated by another output terminal, when the high voltage power supply apparatus does not receive a pulse width modulation signal.

SUMMARY OF THE INVENTION

In accordance with an aspect of the present invention, the present invention provides a high voltage power supply apparatus, which can vary the magnitude of current output therefrom according to environmental conditions and uniformly output the current without an output error.

According to an aspect of the present invention, the present invention further provides a method of correcting current output from the high voltage power supply apparatus.

According to an aspect of the present invention, there is provided a high voltage power supply apparatus including a switching unit; a transformer; a pulse width modulation signal processing unit, which receives a pulse width modulation signal changed for environmental conditions, converts the received pulse width modulation signal into a direct current (DC) voltage, and outputs the converted signal as a reference signal; a drive control signal generating unit, which compares an output current signal output from the transformer with the reference signal, and outputs a drive control signal to drive the switching unit; and an output current detecting unit, which detects the output current signal.

According to another aspect of the present invention, there is provided a method of correcting current output from a high voltage power supply apparatus which includes a switching unit and transformer, the method includes receiving a pulse width modulation signal changed for environmental conditions, converting the received pulse width modulation signal into a DC voltage, and outputting the converted signal as a reference signal; comparing the reference signal with an output current signal detected on a secondary side of the transformer, and generating a drive control signal to drive the switching unit; generating a corrected voltage on a primary side of the transformer; generating the output current signal, from which an output error has been removed by the corrected voltage, on the secondary side of the transformer; and detecting the output current signal generated on the secondary side of the transformer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
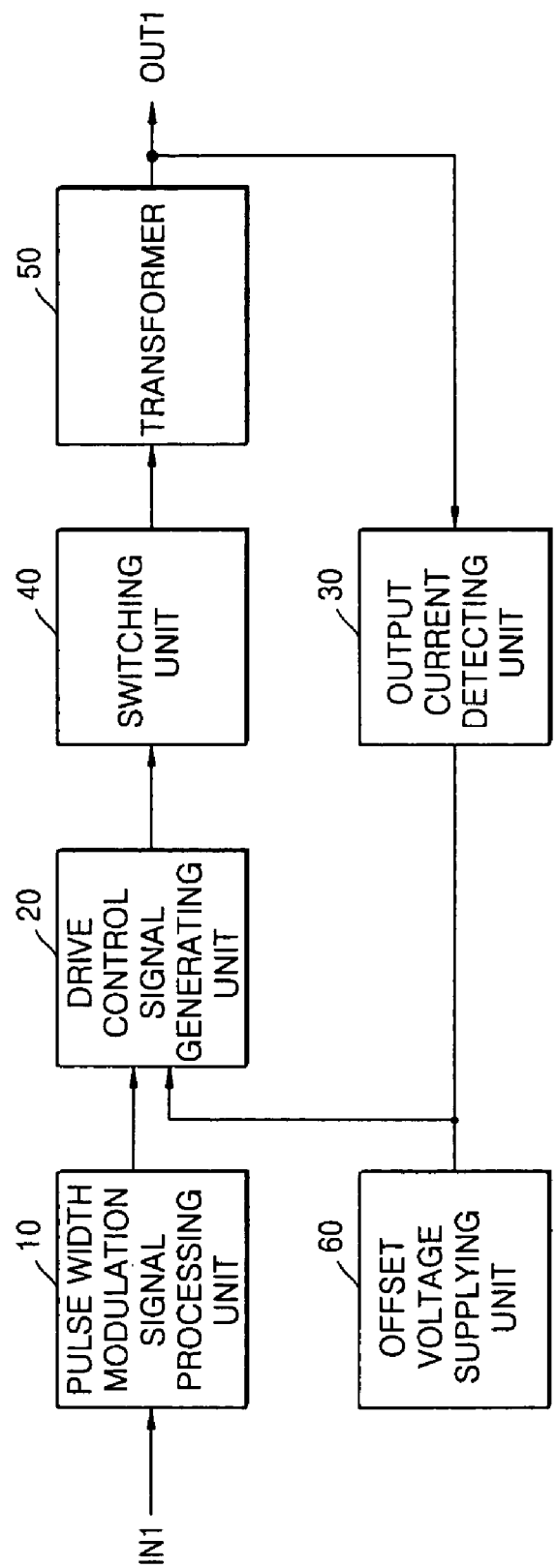
FIG. 1 is a block diagram of a high voltage power supply apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
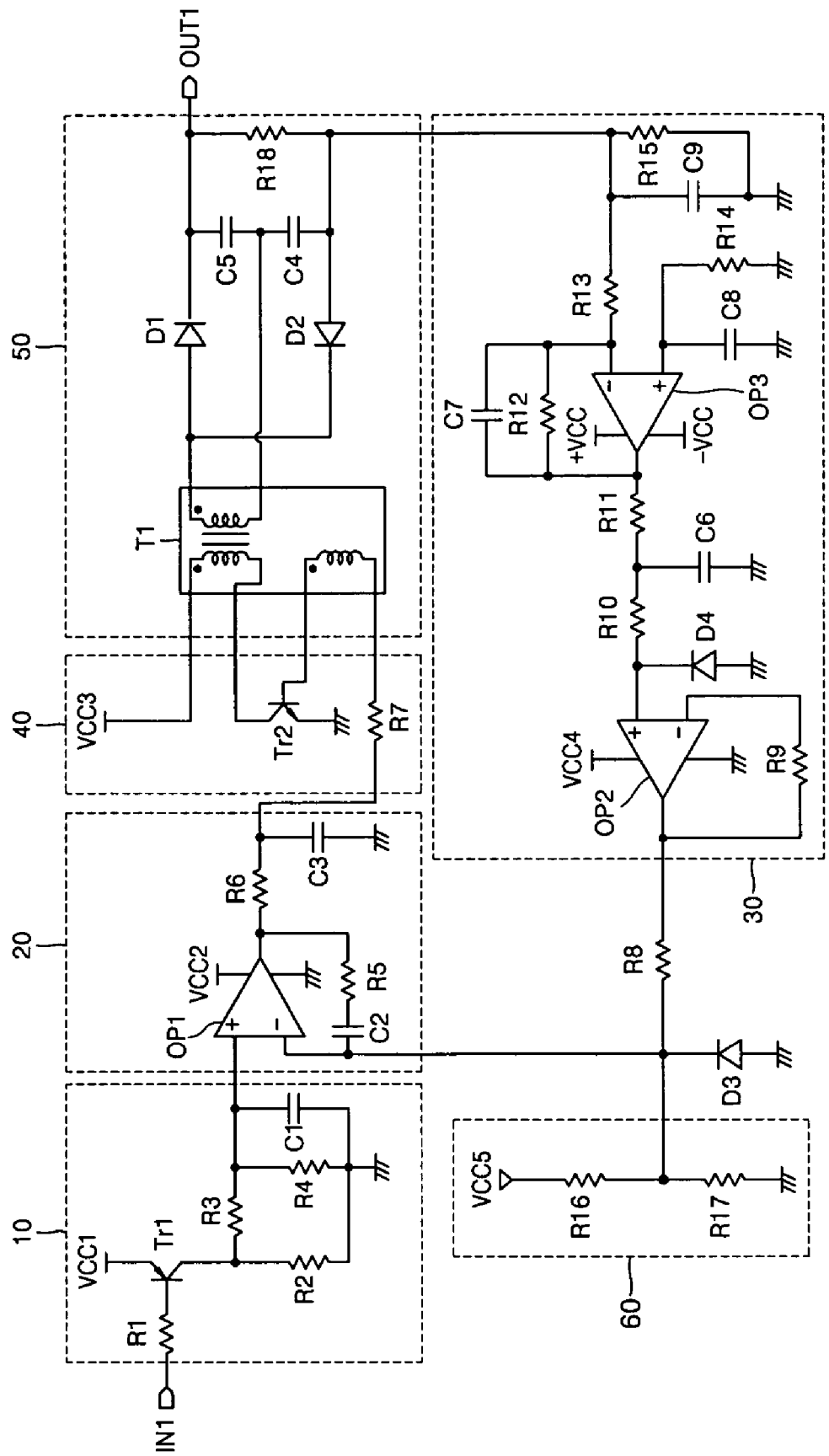
FIG. 2 is a circuit diagram of the high voltage power supply apparatus of FIG. 1.

FIG. 1 is a block diagram of a high voltage power supply apparatus according to an embodiment of the present invention. The high voltage power supply apparatus includes a pulse width modulation signal processing unit 10, a drive control signal generating unit 20, an output current detecting unit 30, a switching unit 40, a fly back transformer 50, and an offset voltage supplying unit 60. FIG. 2 is a circuit diagram of the high voltage power supply apparatus of FIG. 1.

The pulse width modulation signal processing unit 10 receives a pulse width modulation signal changed for environmental conditions through an input terminal IN1, converts the received pulse width modulation signal into a direct current (DC) voltage, and outputs the converted signal as a reference signal. Pulse modulation is a method of varying the characteristics of pulses according to a voice signal or other signal wave. Pulse modulation can be divided into continuous pulse modulation and discontinuous pulse modulation. Continuous pulse modulation is a modulation in which the amplitude, width, or position of pulses continuously varies according to the amplitude of a signal wave. Discontinuous pulse modulation is a modulation in which the number or position of unit pulses varies. Pulse width modulation (PWM) is a form of continuous pulse modulation, in which the width of the pulses varies according to the amplitude of a signal wave. That is, the width of pulses increases if the amplitude of the signal wave is large, and the width of pulses decreases if the amplitude of the signal wave is small. However, the position and the amplitude of pulses do not change. A signal generated by pulse width modulation is referred to as a pulse width modulation signal. The pulse width modulation signal processing unit 10 receives the pulse width modulation signal under the control of a central processing unit (CPU, not shown). The pulse width of the pulse width modulation signal is controlled by the CPU according to environmental conditions.

Figure 3:
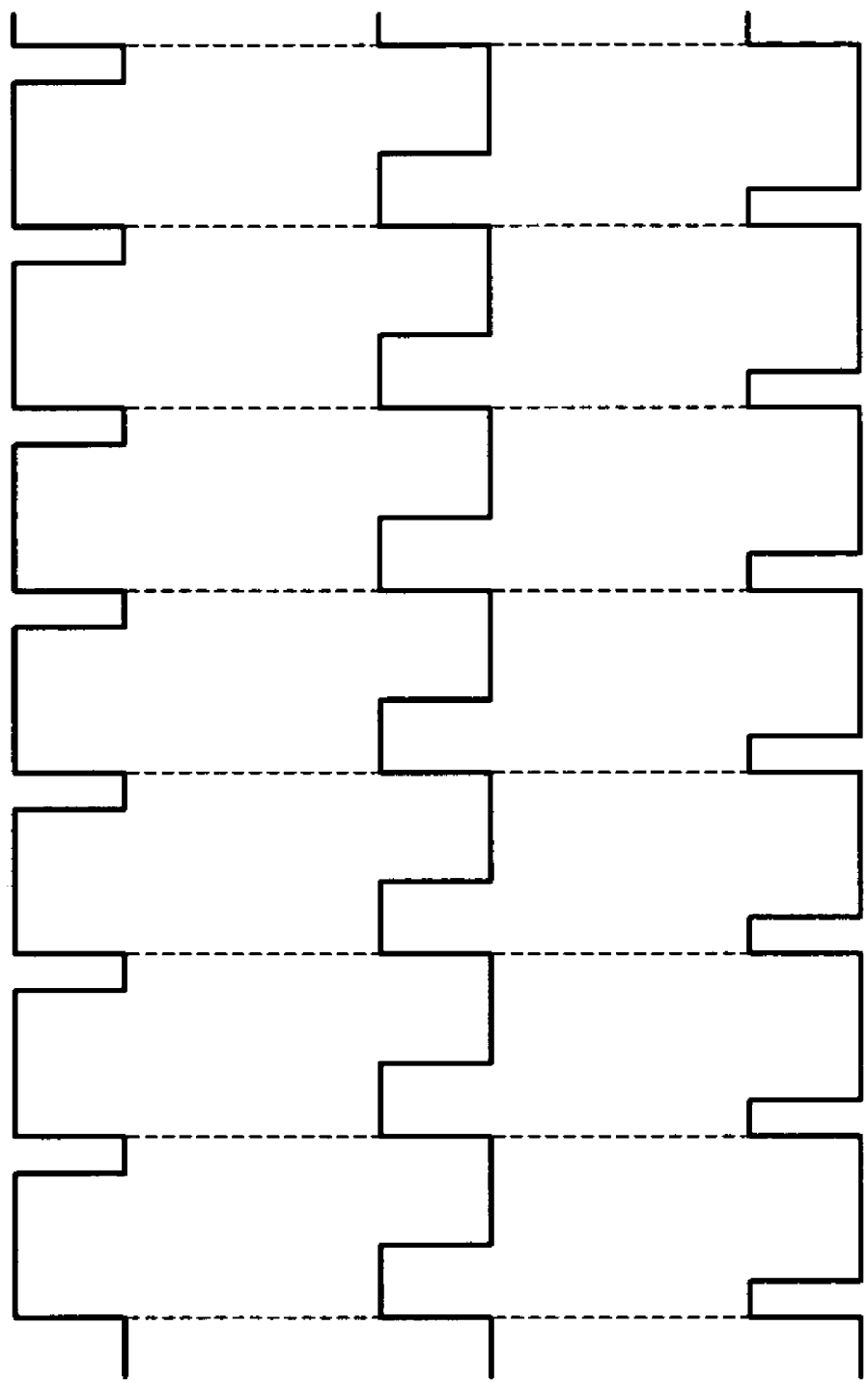
FIGS. 3A-3C are diagrams illustrating waveforms of a pulse width modulation signal input to a pulse width modulation signal processing unit in the high voltage power supply apparatus of FIG. 1.

FIGS. 3A-3C are diagrams illustrating waveforms of the pulse width modulation signal input to the pulse width modulation signal processing unit 10.

If environmental conditions, for example, temperature and humidity, are not favorable during the use of a laser printer, and thus an output current needs to increase, a pulse width modulation signal having a waveform as shown in FIG. 3A is input to the pulse width modulation signal processing unit 10 under the control of the CPU. If the environmental conditions are favorable, a pulse width modulation signal having a waveform as shown in FIG. 3B or 3C is input to the pulse width modulation signal processing unit 10 under the control of the CPU since an excess output current does not need to be used.

Figure 4:
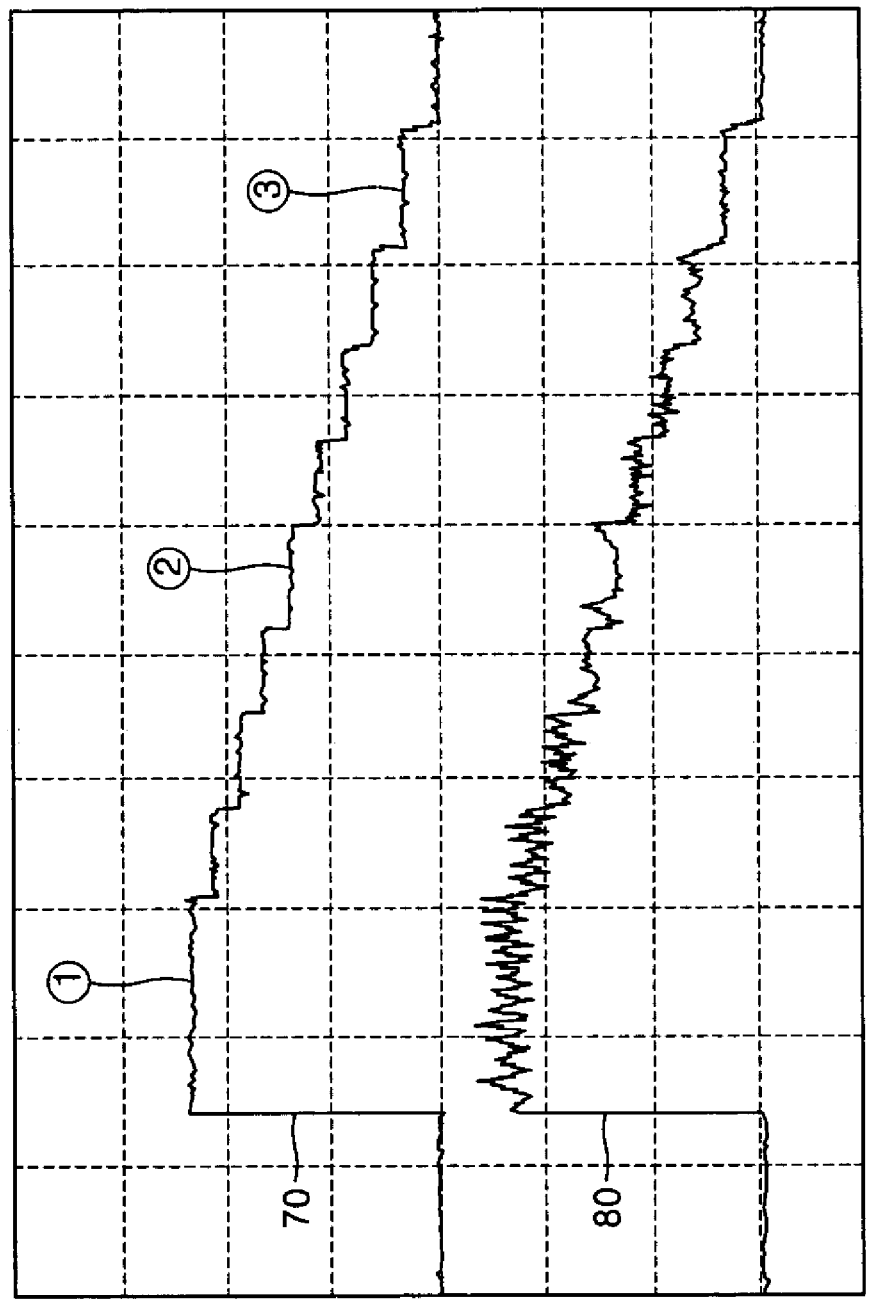
FIG. 4 is a diagram illustrating waveforms of a reference signal output from the pulse width modulation signal processing unit and an output current signal output from a fly back transformer in the high voltage power supply apparatus of FIG. 1.

The pulse width modulation signal processing unit 10 includes a low pass filter (LPF) to convert the received pulse width modulation signal into a DC voltage, as shown in FIG. 2. The LPF only passes frequencies below a given frequency, and converts the pulse width modulation signal into the DC voltage at a capacitor C1. As shown in FIG. 4, the pulse width modulation signal processing unit 10 outputs the converted signal as a reference signal 70 to the drive control signal generating unit 20.

FIG. 4 is a diagram illustrating waveforms of the reference signal 70 output from the pulse width modulation signal processing unit 10 and an output current signal 80 output from the transformer 50 in the high voltage power supply apparatus of FIG. 1.

As an example of the operation of the pulse width modulation signal processing unit, if the pulse width modulation signal having a waveform as shown in FIG. 3A is input to the pulse width modulation signal processing unit 10, a DC voltage having a waveform corresponding to (1) of the reference signal 70 is output from the pulse width modulation signal processing unit 10. If a pulse width modulation signal having a waveform as shown in FIG. 3B is input to the pulse width modulation signal processing unit 10, a DC voltage having a waveform corresponding to (2) of the reference signal 70 is output from the pulse width modulation signal processing unit 10. If a pulse width modulation signal having a waveform as shown in FIG. 3C is input to the pulse width modulation signal processing unit 10, a DC voltage having a waveform corresponding to (3) of the reference signal 70 is output from the pulse width modulation signal processing unit 10.

The drive control signal generating unit 20 compares the output current signal 80 output from the transformer 50 with the reference signal 70, and outputs a drive control signal to drive the switching unit 40. The output current signal 80 is output from the transformer 50 and input to the drive control signal generating unit 20 via the output current detecting unit 30. The drive control signal generating unit 20 compares the reference signal 70 with the output current signal 80 of FIG. 4 to sense a difference between the output current signal 80 and the reference signal 70. If the output current signal 80 is lower than the reference signal 70, the drive control signal generating unit 20 outputs a drive control signal, indicating to the switching unit 40 to output a higher voltage than a previous one, and if the output current signal 80 is higher than the reference signal 70, the drive control signal generating unit 20 outputs a drive control signal, indicating to the switching unit 40 to output a lower voltage than the previous one. The circuitry of the drive control signal generating unit 20 as shown in FIG. 2 is a proportional integral controller, though other configurations for comparing the signals 70 and 80, respectively, and outputting a drive control signal are possible.

If the offset voltage supplying unit 60 is included in a high voltage power supply apparatus, the driving control signal generating unit 20 can compare a predetermined voltage Vcc5 received from the offset voltage supplying unit 60 with the reference signal.

The output current detecting unit 30 detects the output current signal 80. As shown in FIG. 2, the output current detecting unit 30 includes a bipolar operational amplifier OP2 to detect the output current signal 80 output from a secondary side of the transformer 50. The output current detecting unit 30 can detect the output current signal 80 in a simple manner using the bipolar operational amplifier OP2. The output current signal 80 received by the output current detecting unit 30 is output to the drive control signal generating unit 20.

The switching unit 40 generates, in response to the drive control signal output from the drive control signal generating unit 20, a corrected voltage on a primary side of the transformer 50. That is, if the switching unit 40 receives the drive control signal, the switching unit 40 performs a switching operation to generate the corrected voltage on the primary side of the transformer 50. For example, if the switching unit 40 receives a drive control signal indicating to output a higher voltage than a previous one, the switching unit 40 oscillates a higher voltage on the primary side of the transformer 50. If the switching unit 40 receives a drive control signal indicating to output a lower voltage than the previous one, the switching unit 40 oscillates a lower voltage on the primary side of the transformer 50.

The secondary side of the transformer 50 outputs the output current signal 80, from which an output error has been removed by the corrected voltage generated on the primary side of the transformer 50, through an output terminal OUT1. The transformer 50 boosts the corrected voltage using a coil, rectifies the high voltage, and outputs the rectified voltage as the output current signal 80. The output current signal 80 is used for printing operations of the printer and is also applied to the output current detecting unit 30. In an aspect of the present invention, the transformer 50 is a fly back transformer.

The offset voltage supplying unit 60 is located between the drive control signal generating unit 20 and the output current detecting unit 30 and supplies a predetermined voltage VCC5 to the drive control generating unit 20. When a pulse width modulation signal is applied to the pulse width modulation signal processing unit 10 via an input terminal IN1, a composite signal of the predetermined voltage VCC5 of the offset voltage supplying unit 60 and the output current signal output by the output current detecting unit 30 is applied to the drive control signal generating unit 20. However, when no pulse width modulation signals are applied to the pulse width modulation signal processing unit 10, the voltage VCC5 of the offset voltage supplying unit 60 is applied to the drive control signal generating unit 20. Hence, when no pulse width modulation signals are applied to the pulse width modulation signal processing unit 10, the offset voltage supplying unit 60 maintains a voltage at the inverting terminal (−) of an operational amplifier OP1, which is included in the drive control signal generating unit 20 of FIG. 2, to be higher than a voltage at the non-inverting terminal (+) of the operational amplifier OP1. As the voltage at the inverting terminal (−) of the operational amplifier OP1 is kept higher than the voltage at the non-inverting terminal (+) thereof, an output of the operational amplifier OP1 can be kept in a low state all the time. Thus, generation of an abnormal output signal is prevented.

Figure 5A:
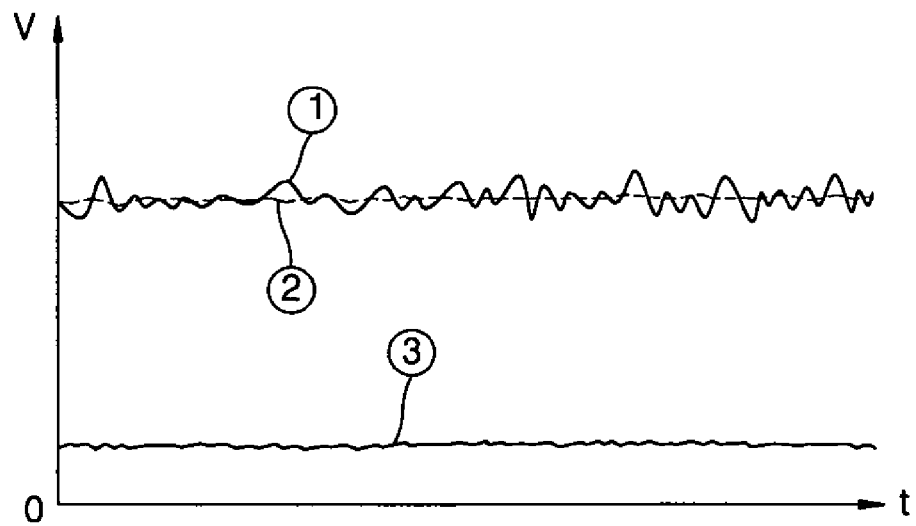
FIGS. 5A and 5B illustrate waveforms of voltages output by an offset voltage supplying unit of FIG. 1 when no pulse width modulation signals are received by the pulse width modulation signal processing unit.
Figure 5B:
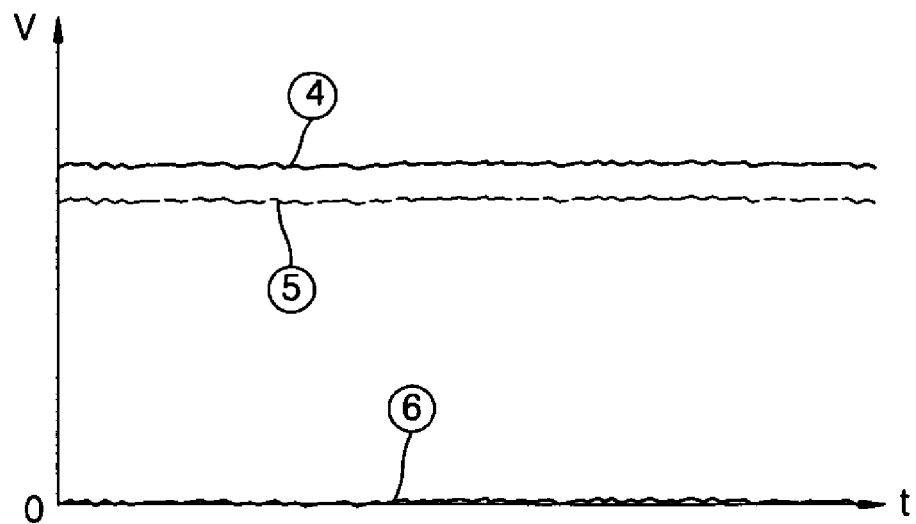

FIGS. 5A and 5B illustrate waveforms of voltages output by the offset voltage supplying unit 60 of FIG. 1 when no pulse width modulation signals are received by the pulse width modulation signal processing unit 10. FIG. 5A illustrates waveforms of voltages output when no pulse width modulation signals are supplied and the offset voltage supplying unit 60 is not included. FIG. 5B illustrates waveforms of voltages output when no pulse width modulation signals are supplied and the offset voltage supplying unit 60 is included. As shown in FIG. 5A, when no predetermined voltages are supplied, a voltage ①at the inverting terminal (−) of the operational amplifier OP1 is almost the same as a voltage ② at the non-inverting terminal (+) thereof. Hence, when no pulse width modulation signals are supplied, a voltage ③ output by a conventional high voltage power supply apparatus is abnormal. However, as shown in FIG. 5B, when a predetermined voltage is supplied, a voltage ④ at the inverting terminal (−) of the operational amplifier OP1 is kept higher than a voltage ⑤ at the non-inverting terminal (+) thereof. Hence, even when no pulse width modulation signals are supplied, a voltage ⑥ output by the high voltage power supply apparatus is nearly zero.

As shown in FIG. 2, the offset voltage supplying unit 60 includes a plurality of resistors, for example, resistors R16 and R17. By using the resistors, the offset voltage supplying unit 70 can control the voltage VCC5 if needed.

A method of correcting current output from a high voltage power supply apparatus will be explained with reference to FIG. 6.

Figure 6:
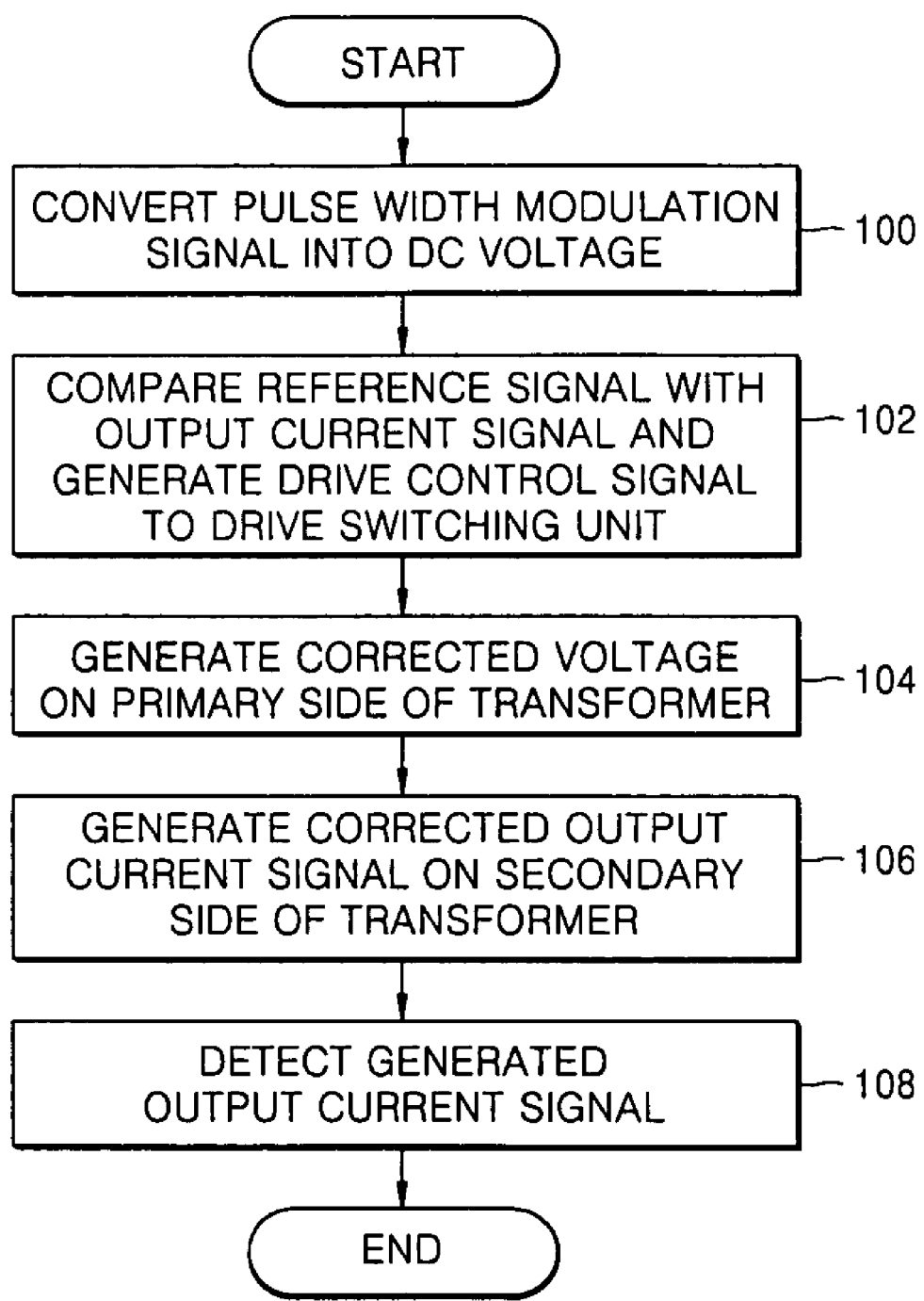
FIG. 6 is a flow chart illustrating a method of correcting current output from a high voltage power supply apparatus according to another embodiment of the present invention.

FIG. 6 is a flow chart illustrating a method of correcting current output from a high voltage power supply apparatus, such as that shown in FIG. 1, according to another embodiment of the present invention. The operations of the method include comparing a reference signal with an output current signal to generate a drive control signal, driving a switching unit in response to the generated drive control signal, and outputting a corrected output current signal.

In operation 100, a pulse width modulation signal changed for environmental conditions is received and converted into a DC voltage. The pulse width modulation signal changed for environmental conditions is generated and supplied under the control of a CPU (not shown). The pulse width modulation signal is converted into the DC voltage using a low pass filter as shown in FIG. 2, in the pulse width modulation signal processing unit 10.

In operation 102, the converted signal, which is used as a reference signal, is compared with an output current signal detected on the secondary side of the fly back transformer 50, and a drive control signal to drive the switching unit 40 is generated. The reference signal is compared with the output current signal using a proportional integral controller, which corresponds to the circuitry in the drive control signal generating unit 20 shown in FIG. 2.

In operation 104, a corrected voltage is generated on a primary side of the fly back transformer 50.

In operation 106, the output current signal, from which an output error has been removed by the corrected voltage, is generated on the secondary side of the fly back transformer 50.

In operation 108, the output current signal generated on the secondary side of the transformer 50 is detected. The output current signal is detected using a bipolar operational amplifier OP2 in FIG. 2.

As described above, the high voltage power supply apparatus and the method of correcting current output from the high voltage power supply apparatus can vary the magnitude of current output from the high voltage power supply apparatus according to environmental conditions, and can uniformly output the current without output errors that occur due to the characteristics of electronic devices used in the high voltage power supply apparatus. Also, even when the high voltage power supply apparatus of the present invention does not receive a pulse width modulation signal, the apparatus supplies a predetermined voltage to a drive control signal generating unit. Thus, the high voltage power supply apparatus can be prevented from malfunctioning due to high voltage induction caused by miniaturization of the system of the high voltage power supply apparatus, noise, or the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A high voltage power supply apparatus, comprising:
a switching unit;
a transformer;
a pulse width modulation signal processing unit which receives a pulse width modulation signal changed for environmental conditions, converts the received pulse width modulation signal into a direct current voltage, and outputs the direct current voltage as a reference signal;
a drive control signal generating unit which compares an output current signal output from the transformer with the reference signal, and outputs a drive control signal to drive the switching unit; and
an output current detecting unit which detects the output current signal,
wherein the switching unit generates, in response to the drive control signal, a corrected voltage on a primary side of the transformer, and the transformer outputs the output current signal, from which an output error has been removed by the corrected voltage, from a secondary side thereof, and
the environmental conditions include temperature and humidity.

2. The high voltage power supply apparatus of claim 1, wherein the pulse width modulation signal processing unit comprises a low pass filter to convert the pulse width modulation signal into the direct current voltage.

3. The high voltage power supply apparatus of claim 1, wherein the drive control signal generating unit comprises a proportional integral controller to compare the output current signal with the reference signal.

4. The high voltage power supply apparatus of claim 1, wherein the output current detecting unit comprises a bipolar operational amplifier to detect the output current signal.

5. The high voltage power supply apparatus of claim 1, further comprising an offset voltage supplying unit which supplies a predetermined voltage to the drive control signal generating unit.

6. The high voltage power supply apparatus of claim 5, wherein the offset voltage supplying unit comprises a plurality of resistors.

7. The high voltage power supply apparatus of claim 5, wherein when the pulse width modulation signal processing unit receives no pulse width modulation signals, the offset voltage supplying unit keeps a voltage at an inverting terminal of an operational amplifier, which is included in the drive control signal generating unit, to be higher than a voltage at a non-inverting terminal of the operational amplifier.

8. A method of correcting current output from a high voltage power supply apparatus which includes a switching unit and a transformer, the method comprising:
receiving a pulse width modulation signal changed for environmental conditions, converting the received pulse width modulation signal into a direct current voltage, and outputting the converted signal as a reference signal;
comparing the reference signal with an output current signal detected on a secondary side of the transformer, and generating a drive control signal to drive the switching unit;
generating a corrected voltage on a primary side of the transformer according to a switching operation;
generating the output current signal, from which an output error has been removed by the corrected voltage, on the secondary side of the transformer; and
detecting the output current signal generated on the secondary side of the transformer,
wherein the environmental conditions include temperature and humidity.

9. The method of claim 8, wherein the pulse width modulation signal is converted into the direct current voltage through low pass filtering.

10. The method of claim 8, wherein the comparing the reference signal with the output current signal comprises integrally controlling the reference signal with the output current signal to generate the drive control signal.

11. The method of claim 8, wherein the output current signal is detected using a bipolar operational amplifier.

12. A switching power supply circuit, comprising:
a pulse width modulation processing circuit which converts a pulse width modulation input signal to a direct current voltage;
a transformer which boosts and rectifies an alternating current input voltage and outputs an output current signal;
a detecting circuit which detects the output current signal output from the transformer;
a control circuit which generates a drive control signal in response to a comparison between the direct current voltage and the output current signal detected by the detecting circuit; and
a switching circuit which turns on and off a switching voltage based on the drive control signal, thereby producing the alternating current input voltage having a predetermined frequency and corrected amplitude at a primary winding of the transformer,
wherein the pulse width modulation input signal is changed for environmental conditions.

13. The power supply circuit of claim 12, wherein when the direct current voltage is larger than the output current signal, the control circuit generates the drive control signal to cause the switching circuit to increase the corrected amplitude at the primary winding of the transformer, and when the direct current voltage is less than the output current signal the control circuit generates the drive control signal to cause the switching circuit to decrease the corrected amplitude at the primary winding of the transformer.

14. The power supply circuit of claim 12, further comprising:
an offset voltage supply circuit which supplies a default voltage to the control circuit at a common terminal with the output current signal.

15. The power supply circuit of claim 14, wherein the default voltage is adjustable by the offset voltage supply circuit.

16. The power supply circuit of claim 15, wherein a plurality of resistors are used to adjust the default voltage.

17. The power supply circuit of claim 15, wherein the offset voltage supply circuit is maintained at a predetermined level to prevent abnormal operation of the power supply circuit when no pulse width modulation input signal is applied to the pulse width modulation processing circuit.

18. The power supply circuit of claim 17, wherein the output current signal is maintained at approximately zero according to the predetermined level maintained by the offset voltage supply circuit.

19. The power supply circuit of claim 15, wherein the offset voltage supply circuit maintains the default voltage at a level so that the control circuit causes the switching circuit to decrease the corrected amplitude at the primary winding of the transformer when the pulse width modulation input signal is not applied to the pulse width modulation processing circuit.

20. The high voltage power supply apparatus of claim 1, wherein the transformer is a fly back transformer.

* * * * *